United States Patent
Gumpoltsberger et al.

(10) Patent No.: US 7,124,659 B2
(45) Date of Patent: Oct. 24, 2006

(54) SIX-GEAR OR SEVEN-GEAR SELECTOR TRANSMISSION FOR A MOTOR VEHICLE

(75) Inventors: Gerhard Gumpoltsberger, Friedrichshafen (DE); Michael Ebenhoch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/771,721

(22) Filed: Feb. 4, 2004

(65) Prior Publication Data
US 2004/0162180 A1 Aug. 19, 2004

(30) Foreign Application Priority Data
Feb. 8, 2003 (DE) .................. 103 05 242

(51) Int. Cl.
*F16H 3/08* (2006.01)
(52) U.S. Cl. .......................... 74/331; 74/335
(58) Field of Classification Search ............ 74/331, 74/335
See application file for complete search history.

(56) References Cited

U.S. PATENT DOCUMENTS

| | | | | |
|---|---|---|---|---|
| 3,589,483 A * | 6/1971 | Smith ................ | 192/3.52 |
| 3,802,293 A * | 4/1974 | Winckler et al. ............ | 74/745 |
| 4,377,951 A | 3/1983 | Magg et al. ................ | 74/477 |
| 4,461,188 A * | 7/1984 | Fisher ................... | 74/330 |
| 4,802,373 A | 2/1989 | Saint-Jean et al. | |
| 5,311,789 A * | 5/1994 | Henzler et al. ............ | 74/331 |
| 5,388,472 A * | 2/1995 | Alfredsson ............... | 74/331 |
| 5,390,560 A * | 2/1995 | Ordo ..................... | 74/329 |
| 5,503,039 A | 4/1996 | Bailly et al. ............. | 74/335 |
| 6,209,407 B1 * | 4/2001 | Heinzel et al. ............ | 74/331 |
| 6,318,211 B1 | 11/2001 | Nitzschke et al. ........... | 74/745 |
| 6,634,247 B1 * | 10/2003 | Pels et al. ............... | 74/329 |
| 6,766,705 B1 * | 7/2004 | Hall, III ................. | 74/331 |
| 6,860,168 B1 * | 3/2005 | Kobayashi ................ | 74/331 |
| 6,895,832 B1 * | 5/2005 | Ishihara et al. ............ | 74/325 |
| 2002/0033059 A1 | 3/2002 | Pels et al. | |
| 2003/0051577 A1 * | 3/2003 | Hirt ..................... | 74/664 |
| 2004/0025612 A1 | 2/2004 | Ahnert et al. | |

(Continued)

FOREIGN PATENT DOCUMENTS

DE 30 00 577 A1 7/1981

(Continued)

*Primary Examiner*—Tisha Lewis
(74) *Attorney, Agent, or Firm*—Davis & Bujold, P.L.L.C.

(57) ABSTRACT

A six-gear or seven-gear vehicle transmission (1, 30) having one starting selector clutch (K1), two countershafts (5, 6), gear wheels non-rotatably disposed upon the input shaft (4) and designed as fixed wheels (12, 13, 14, 33, 37) which are in tooth contact with idler wheels (8, 9, 10, 15, 16, 17, 35, 36), coupling devices (22, 23, 24, 25, 31, 32) non-rotatably and axially movably supported on the two countershafts (5, 6), the same as one output gear wheel (18, 19) upon each of the two countershafts (5, 6) which are in tooth contact with one toothing (20) on a differential transmission (21) each two gear positions in a shifting gate of an H- or multi-H shifting gate (G1-G2; G3-G4; G5-G6; G7-RG) are associated with two different coupling devices (22, 23, 24, 25, 31, 32) in the transmission. To shorten the length and reduce the number of parts, the six-gear and the seven-gear transmissions (1, 30) are designed so that of the fixed wheels (11, 12, 13, 14, 33, 37) situated on the input shaft (4), at least two fixed wheels (12 or 37, 13, 14) are in tooth contact respectively with two idler wheels (8, 15 or 35, 36; 9, 16; 10, 17).

26 Claims, 3 Drawing Sheets

U.S. PATENT DOCUMENTS

| | | | |
|---|---|---|---|
| 2004/0149061 A1* | 8/2004 | Ebenhoch | 74/331 |
| 2005/0000307 A1* | 1/2005 | Gumpoltsberger | 74/331 |
| 2005/0011292 A1* | 1/2005 | Hosono | 74/331 |
| 2005/0115344 A1* | 6/2005 | Kim et al. | 74/331 |

FOREIGN PATENT DOCUMENTS

| | | |
|---|---|---|
| DE | 35 27 390 A1 | 2/1987 |
| DE | 41 36 455 A1 | 5/1993 |
| DE | 41 37 143 A1 | 5/1993 |
| DE | 198 21 164 A1 | 11/1999 |
| DE | 199 23 185 A1 | 12/2000 |
| DE | 101 22 084 A1 | 12/2001 |
| DE | 102 31 547 A1 | 1/2004 |
| EP | 0 545 102 A1 | 6/1993 |
| EP | 545102 A1 * | 6/1993 |
| EP | 1 034 384 B1 | 2/2002 |
| FR | 2 815 103 | 4/2002 |
| WO | 2004/008005 | 1/2004 |

* cited by examiner

SIX-GEAR OR SEVEN-GEAR SELECTOR TRANSMISSION FOR A MOTOR VEHICLE

This application claims priority from German Application Serial No. 103 05 242.9 filed Feb. 8, 2003.

FIELD OF THE INVENTION

The invention relates to a six-gear or seven-gear selector transmission for a motor vehicle.

BACKGROUND OF THE INVENTION

From DE 41 37 143 A1 has become known a multi-step synchronized countershaft transmission in which each two gears are associated with one of several shifting sets. These shifting sets consist as a rule of sliding sleeves axially movably but non-rotatably situated upon a shaft and which during a shifting operation, interacting with synchronizer rings disposed adjacent to the sliding sleeves, decelerate idler wheels and can non-rotatably connect them with the shaft.

In this known transmission, the two gears (first gear and third gear or second gear and fourth gear), associated with one shifting set, are two gears not consecutively following each other. This transmission construction is associated with the advantage that thereby a transmission shifting system is provided with which an overlapping operation and thus reduced shifting times are possible. But it is a disadvantage that such a transmission cannot be shifting with a selector device having one H-shifting gate since, with such a transmission, only gears immediately following each other can be shifting in the same shifting gate.

From EP 10 34 384 B1 a twelve-gear selector transmission for industrial vehicles is further known in which a splitter group is manually actuated while the main- or rear-mounted group is automatically shifted. For the splitter group and the rear-mounted group, pneumatic shifting devices are provided which, during selection of the shifting gate of the gear desired, are correspondingly activated by means of a manual shifting device. The shift pattern obtained thus corresponds to that of an ordinary six-gear selector transmission. But it is disadvantageous in this construction of transmission that separate pneumatic shifting devices have to be provided in order to make shifting the gears in accustomed manner in an ordinary H- or HH-shift pattern possible.

DE 30 00 577 A1 has, in addition, disclosed a selector device for motor vehicle transmission in which a manual shift lever is shifting in an HH shift pattern. Two shift fingers are disposed upon the selector shaft of the transmission, only one shift finger shifting the four gears of the main transmission. When changing from the second to the third shifting gate, one shift valve is actuated which engages the range change group. When shifting to the third and fourth gears, the second shift finger is then in gear. The separate actuation system of the range change group is also a disadvantage here.

DE 35 27 390 A1 also shows a manually shiftable dual-clutch transmission in which during actuation of the shift lever in a shifting gate, one of the two clutches of the dual-clutch is closed. The disadvantage in this shifting device is the limitation to only four forward gears when the shifting has to be purely manual without external force assistance.

It has finally been described in the not pre-published DE 102 331 547 A1, one shifting device for a transmission where at least one shifting set is associated with two non-consecutive ratio steps of the transmission. This shifting device is equipped with a mechanical conversion device by means of which a manual shifting device with one HH shifting gate can operate such a transmission.

In this shifting device 50, shown in FIG. 3, one shift lever 52 is passed into the HH shifting gate 51 and coupled with two selector shafts 53, 54 in a manner such that a movement of the shift lever 52 to a shifting gate 55 results in a swiveling of the selector shaft 53 around its longitudinal axis. In addition, a first gear wheel 56 which meshes with a second gear wheel 57 upon the second selector shaft 54 is fastened upon the first selector shaft 53. When the first selector shaft 53 rotates, the second selector shaft 54 rotates in the opposite direction. When selecting the shifting gate by the shift lever 52 in one selector gate 58, the two selector shafts 53, 54 are moved coupled by force parallel with their longitudinal axes.

The two selector shafts 53, 54 have besides shift fingers 59, 60, 61 which, according to the gear introduced, engage in recesses 62, 63 individual for each gear of shift rods 64 which are connected with shift forks. The shift forks for their part are in communication with the sliding sleeves of the shifting sets which, during an operation for non-rotatable connection of idler wheels with their shaft, are axially moved on these.

Against this background, the problem to be solved by the invention is to introduce the structure of a motor vehicle transmission in which each two gears situated in a shifting gate of an H- or multi-H-shifting gate of a transmission can be actuated by two different shifting sets or coupling devices shiftable by means of a conversion device known from DE 102 31 547 A1. The novel transmission structure must furthermore be utilizable for a six-gear transmission and for a seven-gear transmission to make thus possible to obtain a specially small length.

SUMMARY OF THE INVENTION

The invention departs from a vehicle transmission, having one selector and/or starting clutch, the input side of which is connected with the drive shaft of a prime mover and the output side with an input shaft. In addition, the transmission has two countershafts available preferably aligned parallel with the two input shafts.

Upon the two countershafts gear wheels, designed as idler wheels, are non-rotatably supported while, on the input shaft are fastened several gear wheels designed as fixed wheels, which drive the idler wheels when the clutch is closed. For non-rotatable connection of the idler wheels with the respective countershafts, one coupling device is preferably situated between two respective idler wheels which non-rotatably and by means of setting devices are axially movably supported upon the respective countershaft. The transmission is, in addition, built so that with each two gear positions G1-G2; G3-G4; G5-G6; G7-RG situated in a shifting gate of an H- or multi-H-shifting gate in the transmission are associated two different coupling devices. Besides, two countershafts each have one non-rotatably disposed output gear wheel available which meshes with a toothing on a differential transmission.

Such a motor vehicle transmission has now been developed so that of the fixed wheels located upon the input shaft at least three fixed wheels are in tooth contact with two respective idler wheels.

In a preferred development of the invention, it is provided that in the six-gear transmission or in the seven-gear transmission the idler wheels of the highest gear G6 or G7 and the idler wheels of the second highest gear G5 of G6 are located on one of the countershafts while the idler wheels of the third highest gear G4 or G5 and the idler wheels of the fourth highest gear G3 or G4 are supported on the other countershaft.

The transmission can further be built so that the idler wheel for the second gear and the idler wheel for the reverse gear are supported on different countershafts and driveable by a common fixed wheel.

Insofar as a six-gear transmission is constructed, according to the transmission draft, it is preferably provided that the gear wheels in the transmission, beginning from a direction of the clutch, is arranged in the sequence reverse and second gear, fourth gear and sixth gear, third gear and fifth gear, the same as fist gear, wherein each two idler wheels of different gears up to the first gear are driven by one fixed wheel.

On the contrary, if a seven-gear vehicle transmission should be implemented, according to said transmission draft, it is preferably to be provided that the gear wheels in the transmission, beginning from a direction of the clutch, is arranged in the sequence reverse gear and second gear, fourth gear and sixth gear, fifth gear and seventh gear, first gear and third gear wherein, likewise, up to the first and the third gear each two idler wheels of different gears are driven by one fixed wheel.

Even though the center distances of the two countershafts from the input shaft can be different in the six-gear transmission from those of a seven-gear transmission, nevertheless, to reduce the multiplicity of parts and thus lower the production costs, it is proposed in both transmissions to select the same center distances. Independently of the preferred use of the same center distances in the six-gear and seven-gear transmissions of the kind shown here, it is advantageous to dispose the countershafts forming an angle with the two input shafts. In the manner specially favorable reduction ratios can be adjusted between the output gear wheels on both countershafts and the toothing on the differential transmission.

The proposed structure of the transmission is associated with the advantage that the six-gear vehicle transmission differs from the otherwise, to a gear extent, identically constructed seven-gear vehicle transmission only in that the gear wheels of the third and of the fifth gears are different and that one more fixed wheel and one seventh gear wheel are needed.

Another feature of the inventive structure of the transmission can also concern the arrangement of the output gear wheels on the two countershafts according to which these are preferably fastened on their ends pointing to the clutch.

For a non-rotatable connection of the idler wheels with the respective countershafts, it is convenient in the six-gear and the seven-gear transmission that in the first section of transmission, the fourth gear and the reverse gear with a common coupling device is alternatively non-rotatably connectable with the first countershaft, the same as the second gear and the sixth gear with one other common coupling device alternatively with the second countershaft.

It is further proposed for the six-gear vehicle transmission that the first gear and the third gear with a common coupling device is alternatively non-rotatably connectable with the first countershaft, the same as the fifth gear via a last coupling device with the second countershaft while in the seven-gear vehicle transmission, the first gear and the fifth gear with a common coupling device is alternatively non-rotatably connectable with the first countershaft, the same as the third gear and the seventh gear with one other common coupling device alternatively with the second countershaft.

The coupling device have the same construction in order to reduce the number of parts both in the six-gear and in the seven-gear vehicle transmission, and they can be designed as positive fit dog clutches or as shifting sets. The shifting sets comprise each, in a manner known per se, one sliding sleeve axially movable on the respective countershaft, but non-rotatably connected therewith and synchronizer rings located to the right and/or left thereof.

Regarding the arrangement of the gear wheels of the first gear, of the second gear and of the reverse gear, the area of the front sides of the transmission housing is preferred even through an arrangement of said gear wheels reversing the sequence of gears is possible in the area of the transmission center without departing form the fundamental idea of the invention.

As to the clutch, it is deemed advantageous that it is designed as a powershift clutch, preferably as a multi-disc clutch or dry one-disc clutch.

With the clutch can further be associated one separated starting element, preferably one hydrodynamic torque converter incorporated in the drive train by driving technique between the drive shaft of the prime mover and the input side of the clutch.

Should a reduction of vibrations be needed in the drive train, it is possible to situate a torsional vibration damper between the clutch and the drive shaft of the prime mover.

For the case that the coupling devices are designed on the idler wheels as simple dog clutches, in one other development of the invention, it is possible to situate on both countershafts and/or on the drive shaft one non-wearing transmission brake (retarder) by means of which during an upshift operation, for example, the shafts can be decelerated.

The flexibility of the transmission draft allows, in addition, that at least one other gear wheel be placed on both countershafts and/or on the drive shaft for driving auxiliary units. Such a gear wheel can also serve for driving an electric generator with which an electric energy accumulator can be loaded in the coasting propulsion phases, for example. Such an electric generator can also be actuated by a driving toothing on the input side of the clutch, that is, on the clutch housing, for example.

The inventively designed six-gear and seven-gear transmissions can be combined not only with a power divider differential transmission, for example, for a vehicle having front-wheel drive, but also with a length divider differential transmission so that said transmission can also be used for all-wheel vehicles.

Besides, the setting device for actuating the coupling devices can be designed so as to be actuatable manually or with servo assistance, the setting devices working with servo assistance having piston-cylinder systems which can be operated with a hydraulic or pneumatic pressure means. In order to make shifting possible such a six-gear or seven-gear transmission also with a normal H- or multi-H-shifting gate, in addition, it is provided that a shift lever movement in a shifting gate of the H- or multi-H-shifting gate from one gear position to the next gear position G1-G2; G3-G4; G5-G6; G7-RG can be converted by means of a mechanical conversion device in actuation movements for two different shifting sets of the transmission.

BRIEF DESCRIPTION OF THE DRAWINGS

The invention will now be described, by way of example, with reference to the accompanying drawings in which.

DETAILED DESCRIPTION

Figure 1:
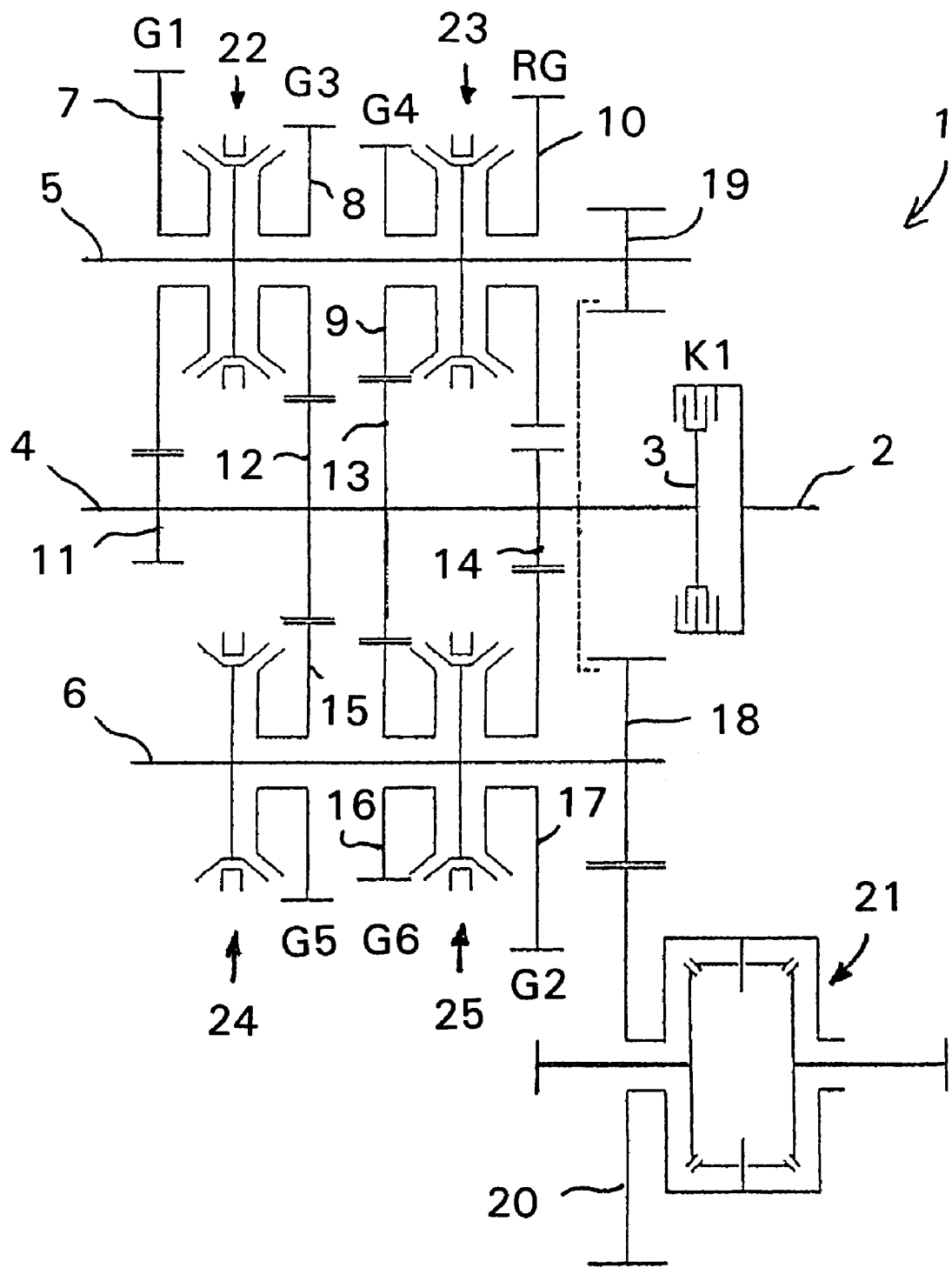
FIG. 1 is a diagrammatic representation of a six-gear vehicle transmission.

As can be understood from FIG. 1, a six-gear vehicle transmission 1 designed according to the fundamental idea of the invention comprises in the first place a starting and/or selector clutch K1 the input side of which is non-rotatably connected with a drive shaft 2 of a prime mover.

An output side 3 of the clutch K1 is in communication with a drive shaft 4 paraxially with which two countershafts 5, 6 are disposed. Upon said two countershafts 5, 6 are non-rotatably supported gear wheels (idler wheels) of the six forward gear the same as of one reverse gear reduction steps which can be driven by gear wheels (fixed wheels) 11, 12, 13, 14 fastened upon the input shaft 4.

On the two countershafts 5, 6, on the ends thereof pointing to the clutch K1, there are further fastened output gear wheels 18, 19 which are in tooth contact with a toothing 20 of an axle differential transmission 21 so that the latter can be driven by both countershafts 5, 6.

In the transmission shown in FIG. 1, to achieve a more compact construction in comparison with the prior art, it is provided that of the fixed wheels 11, 12, 13, 14 are located upon the input shaft 4, three fixed wheels 11, 12, 13, 14 are disposed each of which drives two idler wheels 8, 15; 9, 16; 10, 17 supported on the two countershafts 5, 6.

In the embodiment shown in FIG. 1, the fixed wheel 14 placed closest to the clutch K1 drives the idler wheel 10 for the reverse gear RG supported on the first countershaft 5 and simultaneously the idler wheel 17 for the second gear G2 supported on the second countershaft 6. Besides, upon said input shaft 4 the second fixed wheel 13 is fastened which is in tooth contact with one idler wheel 9 for the fourth gear G4 and with one idler wheel 16 for the sixth gear G6. The third fixed wheel 12, which also drives two idler wheels, serves to drive one idler wheel 8 for the third gear G3 upon the first countershaft 5 and one idler wheel 15 for the fifth gear G5 on the second countershaft 6. On the second input shaft 4 is further fastened one fourth fixed wheel 11 which is in tooth contact with one idler wheel 7 for the first gear G1.

For more clarity it is not shown in this representation that the reverse gear idler wheel 10 is in tooth contact with a reverse gear fixed wheel which is fastened on a separate reverse gear shaft. One other reverse gear fixed wheel upon the reverse gear shaft meshes with the contact toothing 20 on the differential transmission 21.

FIG. 1, however, shows that between the idler wheel 7 for the first gear G1 and the idler wheel 8 for the third gear G3, the same as between the idler wheel 13 for the fourth gear G4 and the idler wheel 10 for the reverse gear RG, one coupling device 22, 23 is respectively situated on the countershaft 5. One other double-duty coupling device 25 is positioned on the second countershaft 6 between the idler wheel 16 for the sixth gear G6 and the idler wheel 17 for the second gear G2 while an easily acting coupling device 24 is associated with the idler wheel 15 for the fifth gear G5.

Figure 3:
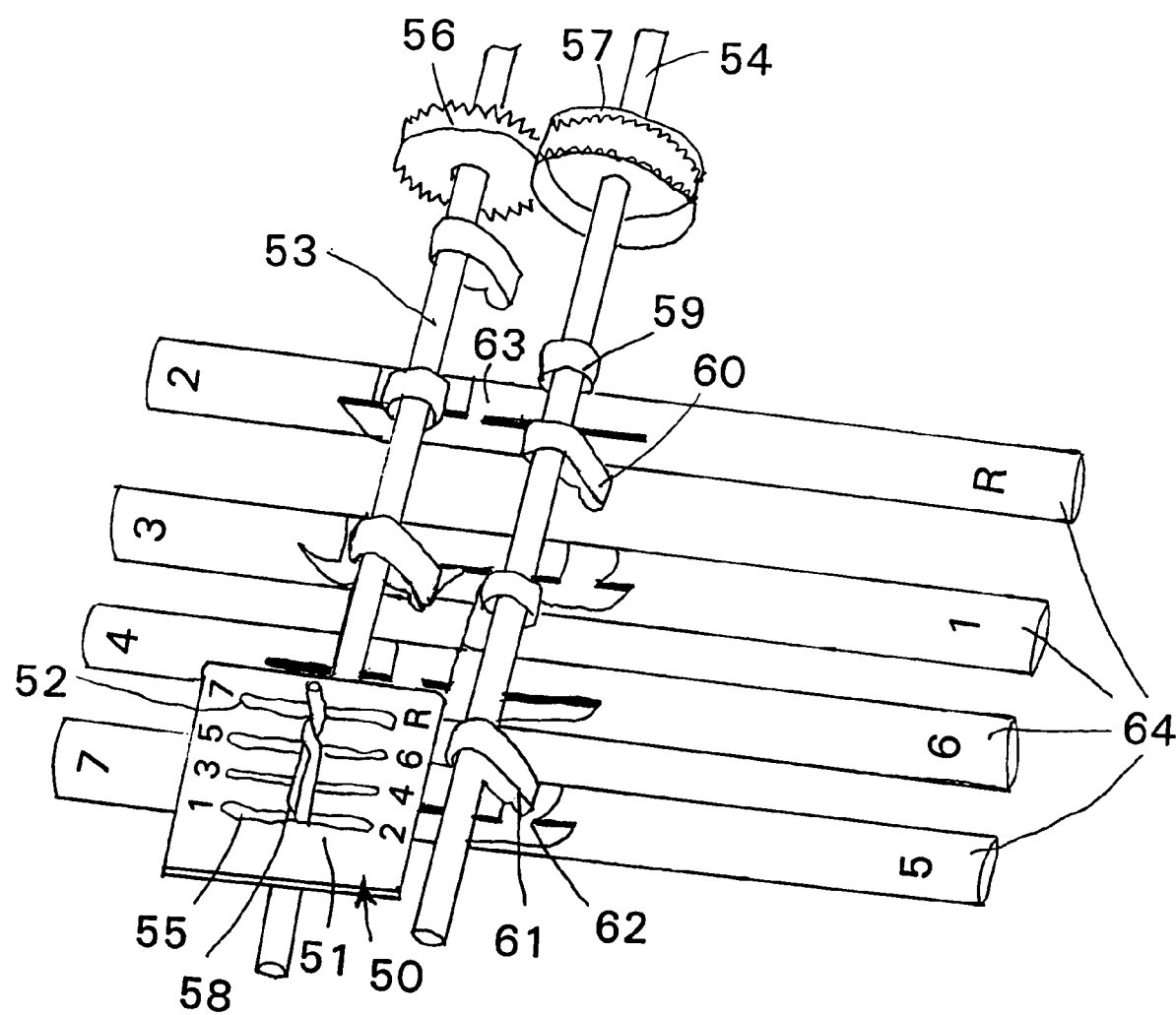
FIG. 3 is a perspective representation of a mechanical conversion device for an HH-shifting device according to the prior art.

In a construction known per se, the coupling devices 22, 23, 24, 25 can be designed as dog clutches or as shifting sets comprising sliding sleeves and synchronizer rings. But concerned in each case are coupling means non-rotatably and axially movably disposed on respective countershafts and with which the idler wheels, to engage a transmission ratio, can be non-rotatably connected with the countershaft associated therewith. The axial movement of said coupling means results with the aid of a mechanical conversion device shown in FIG. 3 and already described, which is hand operable and/or actuatable with servo assisted setting means.

The shown and described construction of the six-gear vehicle transmission makes clear that the length of the transmission can be reduced to a considerable extent by the dual use according to driving technique of the three fixed wheels 12, 13, 14 upon the input shaft 4.

Figure 2:
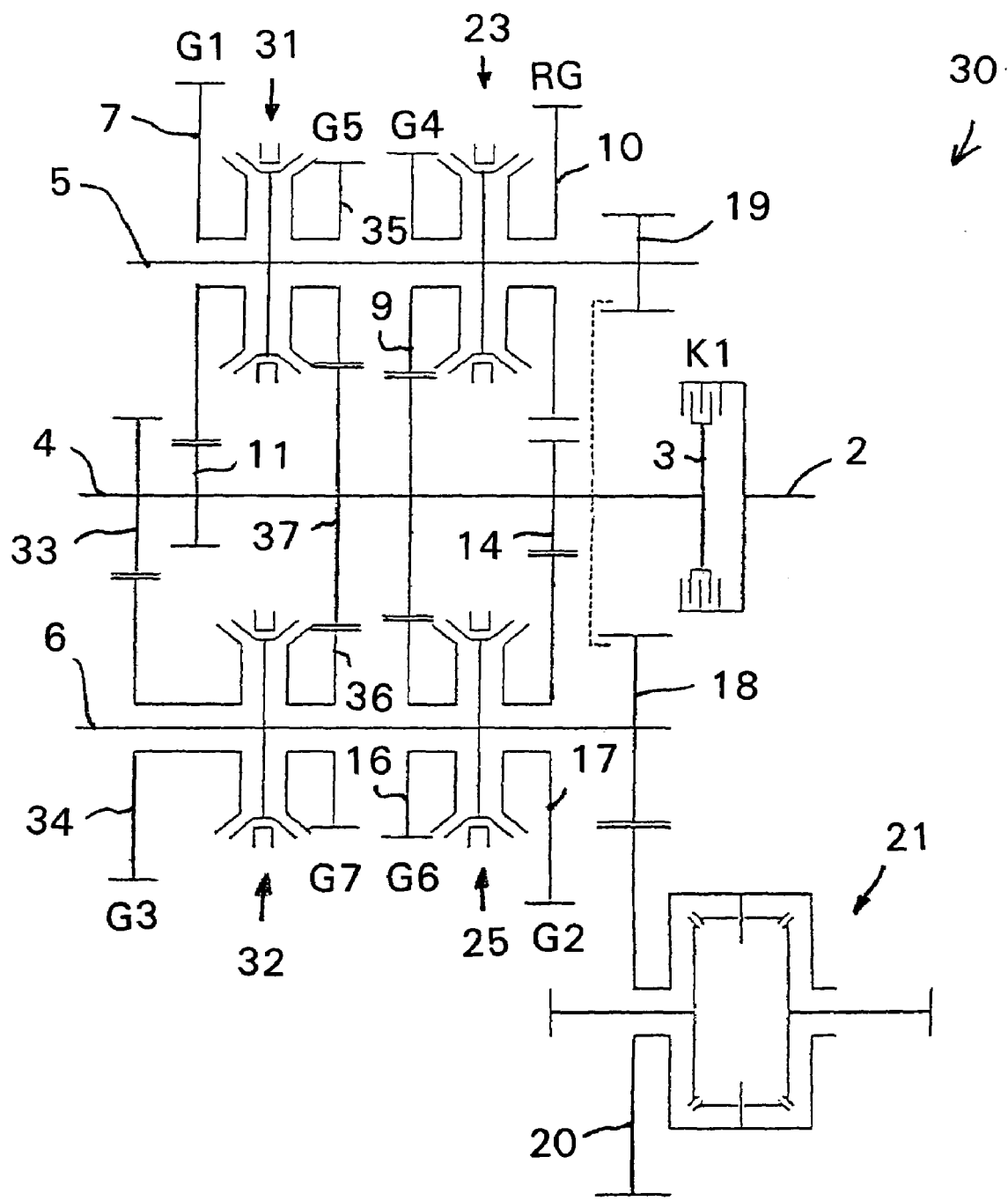
FIG. 2 is a diagrammatic representation of a seven-gear vehicle transmission.

By means of the transmission draft can also be built together with a six-gear transmission 1 a seven-gear transmission 30 without anything structural having to be changed in the multiplicity of parts collected in this area. As FIG. 2 makes clear, the seven-gear vehicle transmission 30 it shows actually consists to a great extent of the parts of the six-gear vehicle transmission 1 shown in FIG. 1 so that in view of the gear number of equal parts and thus high quantity, savings in cost can be achieved in the production of said two types of transmission.

Since the fixed and idler wheels of the reverse gear, the same as of the second, fourth and sixth gear located in the proximity of the clutch K1 are identical with those of the six-gear transmission according to FIG. 1 and are also provided with the same reference numerals, the repetition of the description for this part is omitted here.

The second remaining transmission driveable by the input shaft 4 has available in the first place one fixed wheel 37 fastened upon said input shaft 4 and meshing with an idler gear 35 of the fifth gear G5 situated on the first countershaft 5 and with an idler wheel 36 of the seventh gear G7 situated on the second countershaft 6. There further sit on this input shaft 4, one other fixed wheel 11 which is in tooth contact with the idler wheel 7 of the first gear G1 on the first countershaft 5, the same as a last fixed wheel 33 which drives an idler wheel 34 of the third gear G3 on the second countershaft 6.

Coupling devices 31, 32 situated between the idler wheels 7, 35, respectively, for the first gear G1 and the fifth gear G5, the same as between the idler wheels 34, 36 for the third gear G3 and the seventh gear G7 are here, likewise, designed for double use. This even-gear vehicle transmission has an extremely short length, since three of the five fixed wheels, the same as all four coupling devices, are for double use. The seven-gear vehicle transmission thus can be easily installed in front crosswise design in a motor vehicle.

With vehicle transmission of this kind, there are very well suited ratio sequences obtained for motor vehicles which, despite the multiple use of the reduction steps, are almost progressively graduated in a six-gear and a seven-gear transmission. The ratio sequences become even more ideal when the center distance between the input shaft 4 and the two countershafts 5, 6 are varied. Thus result the ratio sequences shown in the last page of the description.

As it has become clear, the inventive transmission draft has a series of advantages to which belongs the very small length compared with the transmission drafts already known. Furthermore, the transmissions are definitely lighter than these of a different design due to the reduction of the number of parts. Besides, reduction steps, specially well suited for motor vehicles, can be implemented and finally shifting characteristics are ensured with an H- or multi-H-shifting gate by the mechanical conversion device.

| 6-Gear Ratio Sequence (Equal Center Distance) | | | | | | |
| --- | --- | --- | --- | --- | --- | --- |
| | G1 | G2 | G3 | G4 | G5 | G6 | RG |
| Ratio | 14.9 | 7.9 | 5.2 | 4.1 | 3.2 | 2.5 | −11.7 |
| Ratio Range | 1.89 | 1.53 | 1.26 | 1.3 | 1.29 | =6.1 | |

| 6-Gear Ratio Sequence (Variable Center Distance) | | | | | | |
| --- | --- | --- | --- | --- | --- | --- |
| | G1 | G2 | G3 | G4 | G5 | G6 | RG |
| Ratio | 15.2 | 8.4 | 5.4 | 4.2 | 3.2 | 2.5 | −13.5 |
| Ratio Range | 1.8 | 1.55 | 1.3 | 1.3 | 1.27 | =6 | |

| 7-Gear Ratio Sequence (Equal Center Distance) | | | | | | | |
| --- | --- | --- | --- | --- | --- | --- | --- |
| | G1 | G2 | G3 | G4 | G5 | G6 | G7 | RG |
| Ratio | 16.9 | 9.6 | 6.2 | 4.4 | 3.6 | 2.9 | 2.3 | −13.2 |
| Ratio Range | 1.75 | 1.55 | 1.41 | 1.23 | 1.24 | 1.23 | =7.2 | |

| 7-Gear Ratio Sequence Variable Center Distance) | | | | | | | |
| --- | --- | --- | --- | --- | --- | --- | --- |
| | G1 | G2 | G3 | G4 | G5 | G6 | G7 | RG |
| Ratio | 16.8 | 9.4 | 6.0 | 4.3 | 3.5 | 2.8 | 2.3 | −13.7 |
| Ratio Range | 1.78 | 1.57 | 1.40 | 1.24 | 1.22 | 1.21 | =7.2 | |

REFERENCE NUMERALS 1 vehicle transmission
2 drive shaft
3 output side of the clutch
4 transmission input shaft
5 first countershaft
6 second countershaft
7 idler wheel
8 idler wheel
9 idler wheel
10 reverse gear idler wheel
11 fixed wheel
12 fixed wheel
13 fixed wheel
14 fixed wheel
15 idler wheel
16 idler wheel
17 idler wheel
18 output gear wheel
19 output gear wheel
20 toothing on differential
21 differential transmission
22 shifting set or coupling device
23 shifting set or coupling device
24 shifting set or coupling device
25 shifting set or coupling device
30 vehicle transmission
31 shifting set or coupling device
32 shifting set or coupling device
33 fixed wheel
34 idler wheel
35 idler wheel
36 idler wheel
37 fixed wheel
50 transmission shifting device
51 shifting gate
52 shift lever
53 first selector shaft
54 second selector shaft
55 shifting gate
56 gear wheel
57 gear wheel
58 selector gate
59 shift finger
69 shift finger
61 shift finger
62 recess
63 recess
64 shift rod
G1 first gear
G2 second gear
G3 third gear
G4 fourth gear
G5 fifth gear
G6 sixth gear
G7 seventh gear
RG reverse gear
K1 clutch

The invention claimed is:

1. A six-gear or seven-gear vehicle transmission (1, 30) having a single clutch (K1), an input side of which is connected with a drive shaft (2) of a prime mover and an output side (3) with a single input shaft (4), first and second countershafts (5, 6) upon which are rotatably supported idler wheels (7, 8, 9, 10, 15, 16, 17, 34, 35, 36), fixed wheels (11, 12, 13, 14, 33, 37) non-rotatably situated upon said single input shaft (4) and in tooth contact with said idler wheels (7, 8, 9, 10, 15, 16, 17, 34, 35, 36), coupling devices (22, 23, 24, 25, 31, 32) non-rotatably and axially movably supported upon said first and second countershafts (5,6) and movable by setting devices, and an output gear wheel (18, 19) fastened on each of the first and second countershafts (5, 6) and in tooth contact with a toothing (20) of a differential transmission (21), wherein each two gear positions disposed in a shifting gate of one of an H- or multi-H-shifting gate (G1-G2; G3-G4; G5-G6; G7-RG) are associated in the transmission with two different coupling devices (22, 23, 24, 25, 31, 32), of said fixed wheels (11, 12, 13, 14, 33, 37) situated upon said single input shaft (4), at least two fixed wheels (12 or 37, 13, 14) are each in tooth contact with two idler wheels (8, 15; 35, 36; 9, 16; 10, 17); and an idler wheel (17) for a second gear (G2) is situated upon the first countershaft (5) and an idler wheel (10) for a reverse gear (RG) is situated upon the second countershaft (6), and a common fixed wheel (14) drives both idler wheels (10, 17).

2. The six-gear or seven-gear vehicle transmission according to claim 1, wherein an idler wheel (16 or 36) of a highest gear (G6 or G7) and an idler wheel (15 or 16) of a second highest gear (G5 or G6) are situated upon said second countershaft (6) while an idler wheel (9 or 35) of a third highest gear (G4 or G5) and a fourth idler wheel (8 or 9) of a fourth highest gear (G3 or G4) are supported on said first countershaft (5).

3. The six-gear vehicle transmission according to claim 1, wherein the gears of the transmission, beginning from the single clutch (K1), are disposed as follows: reverse gear (RG) and second gear (G2), fourth gear (G4) and sixth gear (G6), third gear (G3) and fifth gear (G5), and first gear (G1).

4. The seven-gear vehicle transmission according to claim 1, wherein said gears of the transmission, beginning from the single clutch (K1), are disposed as follows: reverse gear (RG) and second gear (G2), fourth gear (G4) and sixth gear (G6), fifth gear (G5) and seventh gear (G7) and first gear (G1).

5. The seven-gear vehicle transmission according to claim 1, wherein said first and second countershafts (5, 6) are disposed either paraxially or forming an angle with said single input shaft (4).

6. The six-gear or seven-gear vehicle transmission according to claim 1, wherein said output gear wheels (18, 19) are situated near ends of said first and second countershafts (5, 6) adjacent said single clutch (K1).

7. The six-gear or seven-gear vehicle transmission according to claim 1, wherein fourth gear (G4) and reverse gear (RG) are alternatively non-rotably connectable with said first countershaft (5) by a common coupling device (23), and second gear (G2) and sixth gear (G6) are alternatively non-rotatably connectable with said second countershaft (6) by another common coupling device (25).

8. The six-gear vehicle transmission according to claim 7, wherein first gear (G1) and third gear (G3) are alternatively non-rotatably connectable with said first countershaft (5) by a third common coupling device (22), and fifth gear (G5) is non-rotatably connectable with said second countershaft (6) by a fourth coupling device (24).

9. The six-gear vehicle transmission according to claim 7, wherein first gear (G1) and fifth gear (G5) are alternatively non-rotatably connectable with said first countershaft (5) by a third common coupling device (31), and third gear (G3) and seventh gear (G7) are alternatively non-rotatably connectable with said second countershaft (6) by a fourth common coupling device (32).

10. The six-gear or seven-gear vehicle transmission according to claim 1, wherein said coupling devices (22, 23, 24, 25, 31, 32) are one of positive fit dog clutches and shifting sets.

11. The six-gear or seven-gear vehicle transmission according to claim 10, wherein each one of the coupling devices (22, 23, 24, 25, 31, 32) comprises one sliding sleeve axially movable upon one of the first and second countershafts (5, 6) but non-rotatably connected therewith, and synchronizer rings disposed on both sides thereof.

12. The six-gear or seven-gear vehicle transmission according to claim 1, wherein an idler wheel (7) for a first gear (G1) and said idler wheels (17, 10) for the second gear (G2) and for the reverse gear (RG) are situated in an area of a front side of the transmission.

13. The six-gear or seven-gear vehicle transmission according to claim 1, wherein an idler wheel (7) for a first gear (G1) and said idler wheels (17, 10) for the second gear (G2) and for the reverse gear (RG) are situated in a central area of the transmission.

14. The six-gear seven-gear vehicle transmission according to claim 1, wherein said single clutch (K1) is one of a powershift multi-disc clutch and a one-disc clutch.

15. The six-gear or seven-gear vehicle transmission according to claim 1, wherein one separate starting element is situated between said drive shaft (2) of the prime mover and an input side of said single clutch (K1).

16. The six-gear or seven-gear vehicle transmission according to claim 1, wherein a torsional vibration damper is located between said single clutch (K1) and said drive shaft (2) of the prime mover.

17. The six-gear or seven-gear vehicle transmission according to claim 1, wherein at least one of said first and second countershafts (5, 6) and at least said single input shaft (4) are connected with a non-wearing transmission brake (retarder).

18. The six-gear or seven-gear vehicle transmission according to claim 1, wherein at least one other gear wheel is situated on at least one of said first and second countershafts (5, 6) and on said single input shaft (4) for driving an auxiliary unit.

19. The six-gear or seven-gear vehicle transmission according to claim 1, wherein at least one electric generator is driven by at least one of said first and second countershafts (5, 6) and said single input shaft (4).

20. The six-gear or seven-gear vehicle transmission according to claim 1, wherein one generator is driven by the input side of said single clutch (K1).

21. The six-gear or seven-gear vehicle transmission according to claim 1, wherein said differential transmission (21) is one of a power divider differential transmission and a length divider differential transmission.

22. The six-gear or seven-gear vehicle transmission according to claim 1, wherein said setting devices, for actuating said coupling devices, are actuated either manually or with servo assistance.

23. The six-gear or seven-gear vehicle transmission according to claim 1, wherein said setting devices are actuatable with servo assistance and have piston-cylinder systems which are actuated by one of a hydraulic or a pneumatic pressure medium.

24. The six-gear or seven-gear vehicle transmission according to claim 1, wherein said setting device are actuatable by one of manually and with servo assistance and each comprises one mechanical conversion device which converts a selector lever movement in a shifting gate of an H- or multi-H shifting gate from one gear position to a next gear position (G1-G2; G3-G4; G5;G6; G7-RG) in actuation movements for two shifting sets (22, 23, 24, 25, 31, 32) in said transmission (1, 30).

25. The six-gear or seven-gear vehicle transmission according to claim 1, wherein the single clutch is one of a starting clutch and a selector clutch.

26. The six-gear or seven-gear vehicle transmission according to claim 15, wherein the one separate starting element is a hydrodynamic torque converter.

* * * * *